(12) United States Patent
Hsu

(10) Patent No.: US 9,663,176 B1
(45) Date of Patent: May 30, 2017

(54) STRUT FIXING DEVICE

(71) Applicant: Sunny Wheel Industrial Co., Ltd., Chang Hua Hsien (TW)

(72) Inventor: Kuo-Chung Hsu, Chang Hua Hsien (TW)

(73) Assignee: Sunny Wheel Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 15/207,941

(22) Filed: Jul. 12, 2016

(30) Foreign Application Priority Data

Jan. 26, 2016 (TW) .............................. 105201133 U

(51) Int. Cl.
*B62D 25/18* (2006.01)
*B62J 15/02* (2006.01)

(52) U.S. Cl.
CPC ..................................... *B62J 15/02* (2013.01)

(58) Field of Classification Search
CPC ............. B62J 15/02; B62J 15/00; B62J 15/04
See application file for complete search history.

(56) References Cited

U.S. PATENT DOCUMENTS

| | | | | |
|---|---|---|---|---|
| 1,226,323 A * | 5/1917 | Fialkowski | .............. | B62J 15/00 280/152.3 |
| 1,266,251 A * | 5/1918 | Green | ..................... | B62J 15/00 280/152.1 |
| 1,490,534 A * | 4/1924 | McCauley | ............... | B62J 15/02 280/152.1 |
| 1,546,651 A * | 7/1925 | Green | ..................... | B62J 15/02 280/152.1 |
| 1,577,146 A * | 3/1926 | Pawsat | .................... | B62J 15/02 280/152.1 |
| 5,899,473 A * | 5/1999 | Mackenzie | .............. | B62J 15/00 280/152.1 |
| 5,954,354 A * | 9/1999 | Chung | .................... | B62J 15/02 280/152.1 |
| 6,659,483 B2 * | 12/2003 | Blythe | .................... | B62J 15/00 280/152.1 |
| 6,913,274 B2 * | 7/2005 | Hsu | ......................... | B62J 15/02 280/152.1 |
| 7,625,012 B2 * | 12/2009 | Hsu | ......................... | B62J 15/02 280/152.1 |
| 8,172,246 B2 * | 5/2012 | Bybee | ..................... | B62J 15/02 280/152.1 |
| 8,246,062 B2 * | 8/2012 | Hsu | ......................... | B62J 15/02 280/152.1 |

* cited by examiner

Primary Examiner — James M Dolak
(74) Attorney, Agent, or Firm — Trop Pruner & Hu, P.C.

(57) ABSTRACT

A strut fixing device includes a base plate having a bottom plate portion, a fixing hook, and a coupling frame. The fixing hook has a connecting portion connected to the bottom plate portion, a curved bending portion extending from the connecting portion, defining an opening, and being resiliently deformable, an abutting portion formed at an end of the portion that is distal from the connecting portion, and a stop portion. The abutting portion abuts against the stop portion when the abutting portion is deformed to close the opening, thereby securing a strut to the bending portion. The coupling frame is disposed on the bottom plate portion of the base plate and is adapted to engage an engaging hole of a mudguard.

10 Claims, 7 Drawing Sheets

STRUT FIXING DEVICE

CROSS-REFERENCE TO RELATED APPLICATION

This application claims priority of Taiwanese Patent Application No. 105201133, filed on Jan. 26, 2016.

FIELD

The disclosure relates to a fixing device, and more particularly to a strut fixing device.

BACKGROUND

Generally, a method for fixing a mudguard on a bicycle is to use a strut having an end that is fixed on a frame of the bicycle, and an opposite end that is connected to the mudguard. The opposite end of the strut is generally secured to the mudguard by an iron plate that is riveted on the mudguard.

Referring to FIG. 1, German Patent No. 102009060429B4 discloses a conventional strut fixing device 91 for fixing a strut 915 on a mudguard. The conventional strut fixing device 91 includes a base plate 911, a bending portion 912 extending from the base plate 911 and cooperating with the base plate 911 to define an opening 914, and a stop portion 913 being adjacent to the opening 914 and extending from the base plate 911 toward the bending portion 912. When fixing the strut 915 on the mudguard, a user needs to push the strut 915 against the stop portion 913 to result in a deformation of the stop portion 913, so that the strut 915 is allowed to pass through the opening 914, and be eventually secured to the strut 915 after the stop portion 913 is restored to block the opening 914. When removing the strut 915, the bending portion 912 and the stop portion 913 should be simultaneously pushed to deform, thus allowing the strut 915 to be removed from the mudguard through the opening 914. With utilization of the conventional strut fixing device 91, the user can conveniently replace the mudguard on his/her own.

However, since the stop portion 913 is deformed in a same direction when the strut 915 being coupled to or removed from the conventional strut fixing device 91, the stop portion 913 may eventually fracture due to fatigue. Furthermore, the removal of the strut 915 from the conventional strut fixing device 91 is inconvenient since the bending portion 912 and the stop portion 913 need to be simultaneously pushed.

Referring to FIG. 2, German Patent No. 202015104496U1 discloses another conventional strut fixing device 92 which includes a base plate 921, and a bending portion 922 extending from the base plate 921 and cooperating with the base plate 921 to define an opening 924. The opening 924 can be blocked by extending a screw member 923 through the base plate 921 into the bending portion 922 so as to secure a strut 925 to the conventional strut fixing device 92. By removing the screw member 923, the opening 924 can be unblocked to permit separation of the screw member 923 from the conventional strut fixing device 92.

However, the user still needs to use a screwdriver to apply or remove the screw member 923, thereby rendering the conventional strut fixing device 92 inconvenient in use.

SUMMARY

Therefore, an object of the disclosure is to provide a strut fixing device that can alleviate at least one of the drawbacks associated with the abovementioned prior art.

Accordingly, the strut fixing device is adapted to fix a strut on a mudguard. The mudguard is formed with an engaging hole. The strut fixing device includes a base plate, a fixing hook, and a coupling frame. The base plate has a bottom plate portion. The fixing hook has a connecting portion that is connected to the bottom plate portion of the base plate, a bending portion that extends from the connecting portion, that is curved, that defines an opening, and that is resiliently deformable, an abutting portion that is formed at an end of the bending portion distal from the connecting portion, and a stop portion. The abutting portion abuts against the stop portion when the abutting portion is deformed to close the opening, thereby securing the strut to the bending portion. The coupling frame is disposed on the bottom plate portion of the base plate, and is adapted to engage the engaging hole of the mudguard.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
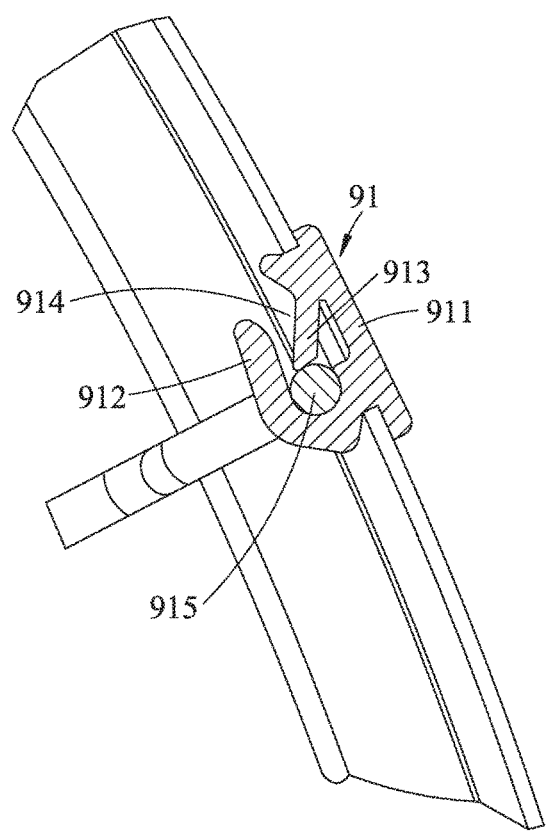
FIG. 1 is a fragmentary sectional view of a conventional strut fixing device that is disclosed in German Patent No. 102009060429B4, connecting a strut to a mudguard.
Figure 2:
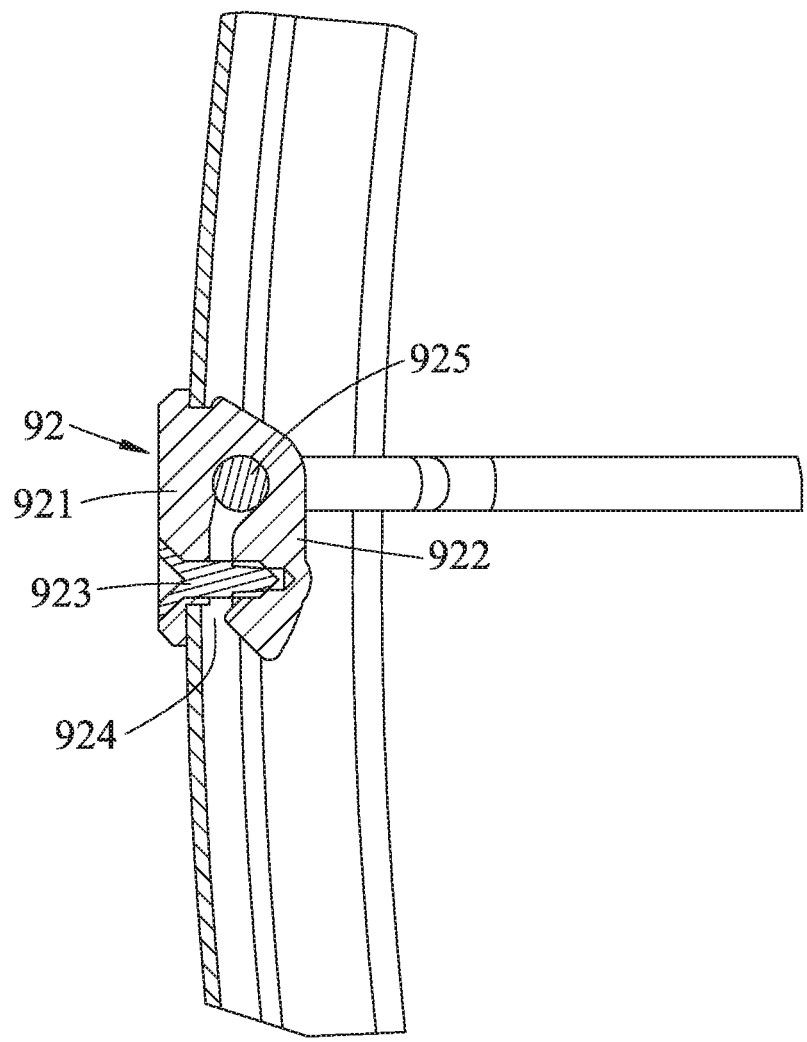
FIG. 2 is a fragmentary sectional view of another conventional strut fixing device that is disclosed in German Patent No. 202015104496U1, connecting a strut to a mudguard.
Figure 3:
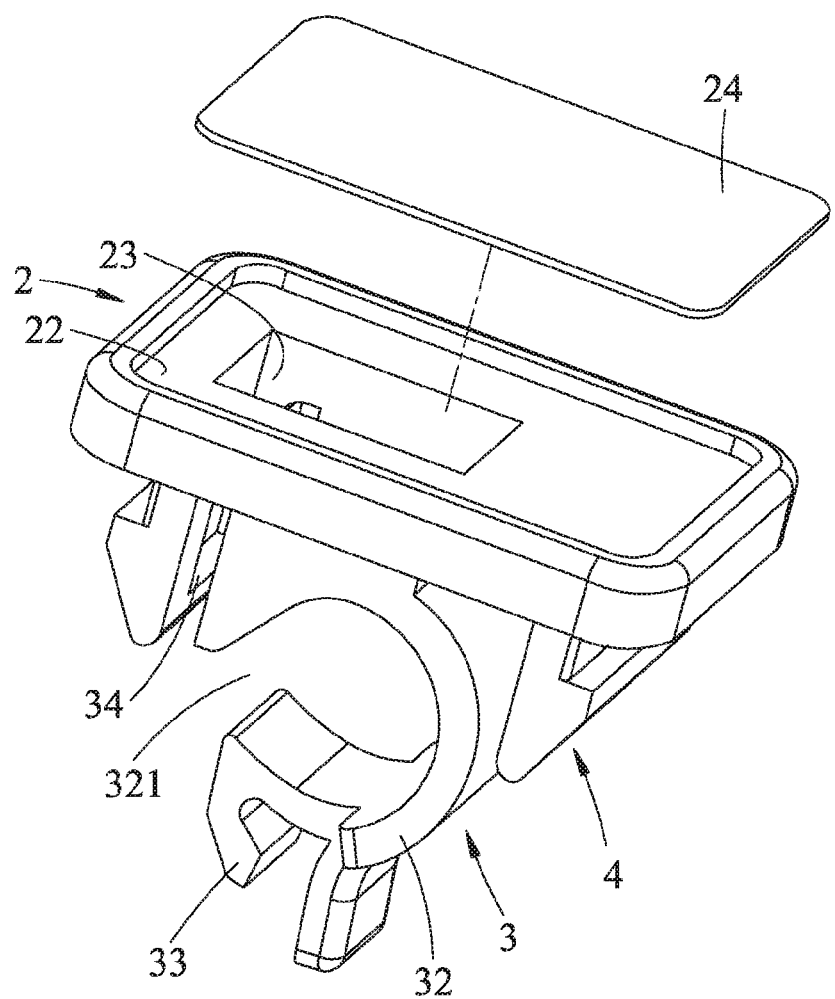
FIG. 3 is an exploded perspective view of an embodiment of a strut fixing device according to the disclosure.
Figure 4:
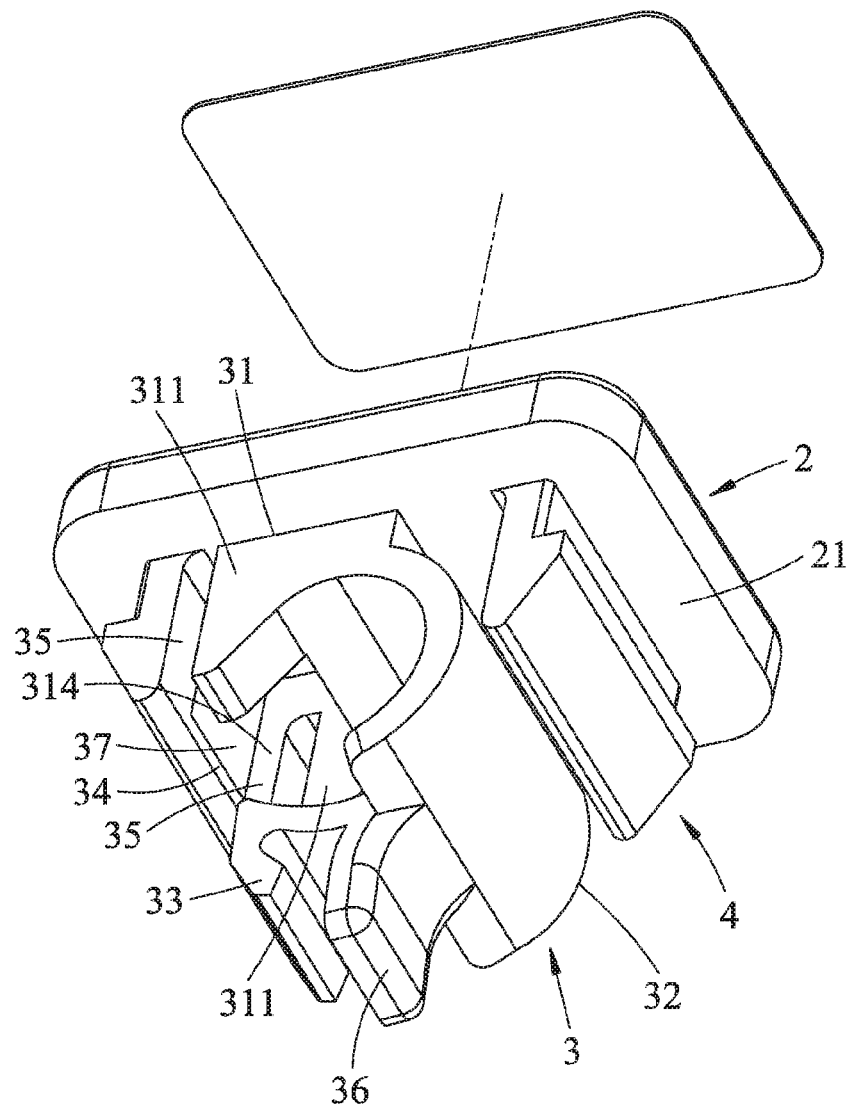
FIG. 4 is another exploded perspective view of the embodiment.
Figure 5:
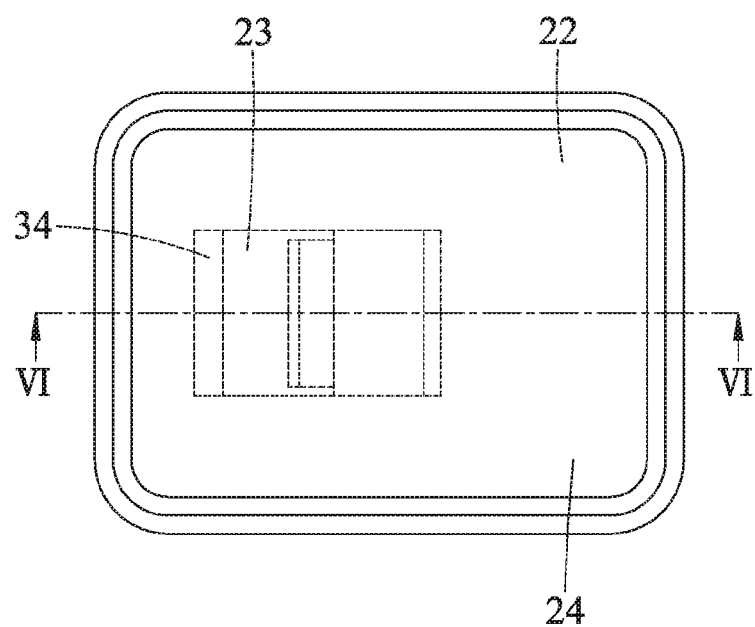
FIG. 5 is a top view of the embodiment.
Figure 7:
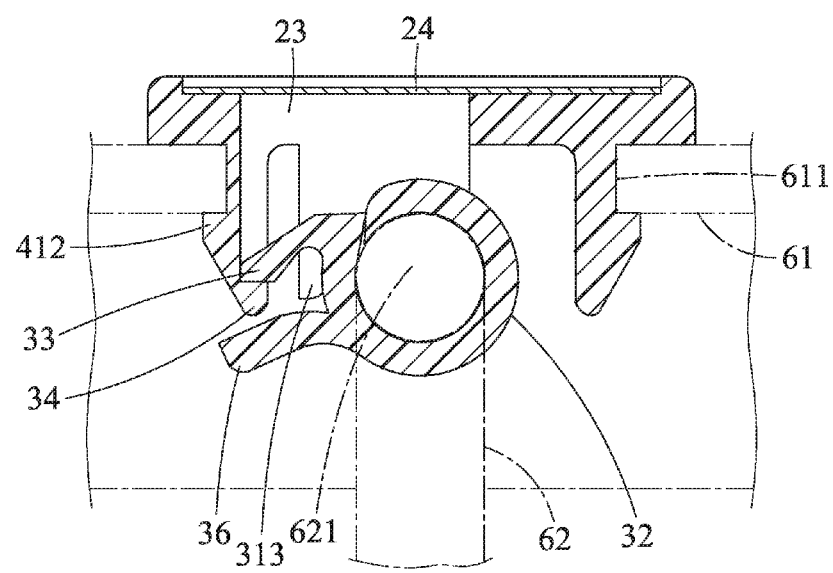
FIG. 7 is a view similar to FIG. 6, but illustrating the abutting portion abutting against the stop portion.

As shown in FIGS. 3 to 5, an embodiment of a strut fixing device according to the present disclosure is adapted to fix a strut 62 (see FIG. 7) on a mudguard 61 (see FIG. 7). The strut fixing device includes a base plate 2, a fixing hook 3, and a coupling frame 4.

The base plate 2 has a bottom plate portion 21, a top plate portion 22 opposite to the bottom plate portion 21, an operating hole 23 extending through the top and bottom plate portions 22, 21, and a labeling member 24 disposed removably on the top plate portion 22 for covering the operating hole 23.

Figure 6:
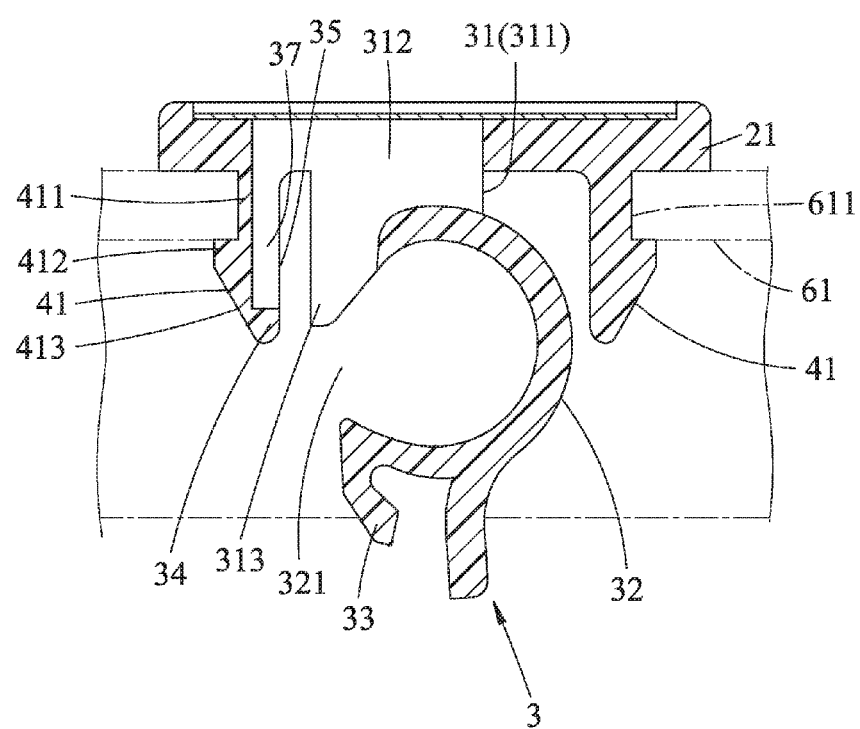
FIG. 6 is a sectional view of the embodiment taken along line VI-VI in FIG. 5, illustrating a stop portion of a fixing hook that is separated from a stop portion of the fixing hook.

The fixing hook 3 has a connecting portion 31 connected to the bottom plate portion 21 of the base plate 2, a bending portion 32, an abutting portion 33, a stop portion 34, two extending portions 35, and an operating portion 36. The bending portion 32 extends from the connecting portion 31, is curved, defines an opening 321, and is resiliently deformable. The abutting portion 33 is formed at an end of the bending portion 32 distal from the connecting portion 31. The extending portions 35 extend respectively from two opposite ends of the stop portion 34 toward the bottom plate portion 21 of the base plate 2. The operating portion 36 is disposed on the bending portion 32 for being held by a user to deform the bending portion 32. Referring to FIGS. 4 and 6, the connecting portion 31 of the fixing hook 3 has two side plates 311 spaced apart from each other. Each of the side plates 311 has a base section 312 interconnecting the bottom plate portion 21 of the base plate 2 and the bending portion 32, and a supporting section 313 extending from the base section away from the bottom plate portion 21 of the base plate 2. The operating hole 23 of the base plate 2 is disposed at a position that corresponds to the stop portion 34 of the fixing hook 3.

The coupling frame 4 is disposed on the bottom plate portion 21 of the base plate 2 and is adapted to engage an engaging hole 611 of the mudguard 61. The coupling frame 4 has two coupling feet 41 respectively disposed at two opposite sides of the fixing hook 3. Each of the coupling feet 41 has a main portion 411 connected to the bottom plate portion 21 of the base plate 2, and a projecting portion 412 extending from the main portion 411 away from the fixing hook 3.

In this embodiment, the stop portion 34 of the fixing hook 3 is formed integrally on the main portion 411 of one of the coupling feet 41, and located opposite to the projecting portion 412 of the one of the coupling feet 41. The extending portions 35 of the fixing hook 3 cooperates with the stop portion 34 and the main portion 411 of the one of the coupling feet 41 to define an engaging space 37. Referring further to FIG. 7, when the abutting portion 33 is deformed to close the opening 321, the abutting portion 33 abuts against the stop portion 34 and engages the engaging space 37. The supporting sections 313 of the side plates 311 define a guiding space 314 for receiving the bending portion 32 and the abutting portion 33 when the abutting portion 33 abuts against the stop portion 34.

The projecting portion 412 of each of the coupling feet 41 has an inclined surface 413. A distance between the inclined surface 413 of the projecting portion 412 of each of the coupling feet 41 and the main portion 411 of a corresponding one of the coupling feet 41 gradually decreases in a direction away from the bottom plate portion 21 of the base plate 2.

In use, the user needs to insert the coupling feet 41 of the coupling frame 4 through the engaging hole 611 from outside of the mudguard 61, such that the projecting portions 412 of the coupling feet 41 abut against an inner surface of the mudguard 61, and that the bottom plate portion 21 of the base plate 2 abuts against an outer surface of the mudguard 61, thereby completing the installation of the strut fixing device onto the mudguard 61.

Referring to FIGS. 6 and 7, an operating rod 621 of the strut 62 is then placed in the bending portion 32 of the fixing hook 3 through the opening 321. Afterwards, the user pushes the operating portion 36 to deform the bending portion 32 until the opening 321 is closed and the abutting portion 33 abuts against the stop portion 34, thereby confining the operating rod 621 and securing the strut 62 on the mudguard 61. It should be noted that, at this time, the supporting sections 313 of the side plates 311 can support and position the bending portion 32 by virtue of the bending portion 32 disposed therebetween. Moreover, since the stop portion 34 is located opposite to the projecting portion 412 of the one of the coupling feet 41, when the abutting portion 33 abuts against the stop portion 34, the abutting portion 33 will push the one of the coupling feet 41 against the mudguard 61, so that the coupling frame 4 can more stably engage the engaging hole 611 of the mudguard 61.

When removing the strut 62, the user first needs to remove the labeling member 24 from the base plate 2, then insert any tool through the operating hole 321 to push the abutting portion 33 away from the stop portion 34, so that the bending portion 32 is driven to restore to open the opening 321. With the opening 321 being opened, the user can then remove the operating rod 621 of the strut 62 from the bending portion 32 through the opening 321.

When removing the strut fixing device from the mudguard 61, the user need only continuously push the projecting portions 412 of the coupling feet 41 to disengage from the engaging hole 611, then remove the strut fixing device from the mudguard 61.

Since the bending portion 32 deforms in different directions when installing and removing the strut 62, the bending portion 32 would not easily fracture due to fatigue. Moreover, the strut fixing device of the disclosure is convenient to be installed without the need for use of a specific tool.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A strut fixing device for fixing a strut on a mudguard, the mudguard being formed with an engaging hole, said strut fixing device comprising:
   a base plate having a bottom plate portion;
   a coupling frame disposed on said bottom plate portion of said base plate and engaging the engaging hole of the mudguard; and
   a fixing hook having:
      a connecting portion that is connected to said bottom plate portion of said base plate,
      a bending portion that extends from said connecting portion, wherein the bending portion is curved to define an opening, and wherein the bending portion is resiliently deformable;
      an abutting portion that is formed at an end of said bending portion distal from said connecting portion, and
      a stop portion, said abutting portion abutting against said stop portion when said abutting portion is deformed to close said opening of the bending portion, thereby securing the strut to said bending portion.

2. The strut fixing device as claimed in claim 1, wherein said coupling frame has two coupling feet respectively disposed at two opposite sides of said fixing hook, each of said coupling feet having
   a main portion that is connected to said bottom plate portion; and a projecting portion that extends from said main portion away from said fixing hook.

3. The strut fixing device as claimed in claim 2, wherein:
said projecting portion of each of said coupling feet has an inclined surface; and
a distance between said inclined surface of said projecting portion of each of said coupling feet and said main portion of a corresponding one of said coupling feet gradually decreases in a direction away from said bottom plate portion.

4. The strut fixing device as claimed in claim 2, wherein said stop portion of said fixing hook is formed integrally on said main portion of one of said coupling feet, and that is located opposite to said projecting portion of said one of said coupling feet.

5. The strut fixing device as claimed in claim 4, wherein said fixing hook further has two extending portions extending respectively from two opposite ends of said stop portion toward said bottom plate portion of said base plate, and cooperating with said stop portion and said main portion of said one of said coupling feet to define an engaging space engaged with said abutting portion when said abutting portion abuts against said stop portion.

6. The strut fixing device as claimed in claim 1, wherein:
said connecting portion of said fixing hook has two side plates spaced apart from each other; and
each of said side plates has a base section interconnecting said bottom plate portion of said base plate and said bending portion.

7. The strut fixing device as claimed in claim 6, wherein:
each of said side plates further has a supporting section extending from said base section away from said bottom plate portion of said base plate; and
said supporting sections of said side plates define a guiding space for receiving said bending portion and said abutting portion when said abutting portion abuts against said stop portion.

8. The strut fixing device as claimed in claim 1, wherein said fixing hook further has an operating portion disposed on said bending portion for being held by a user to deform said bending portion.

9. The strut fixing device as claimed in claim 1, wherein said base plate further has:
a top plate portion opposite to said bottom plate portion; and
an operating hole extending through said top and bottom plate portions, and disposed at a position that corresponds to said stop portion of said fixing hook.

10. The strut fixing device as claimed in claim 9, wherein said base plate further has a labeling member disposed removably on said top plate portion for covering said operating hole.

* * * * *